US005737001A

United States Patent [19]

Taylor

[11] Patent Number: 5,737,001

[45] Date of Patent: Apr. 7, 1998

[54] PRESSURE REGULATING APPARATUS FOR INK DELIVERED TO AN INK-JET PRINT HEAD

[75] Inventor: John L. Taylor, Corvallis, Oreg.

[73] Assignee: Hewlett-Packard Company, Palo Alto, Calif.

[21] Appl. No.: 674,522

[22] Filed: Jul. 2, 1996

[51] Int. Cl.[6] .............................. B41J 2/175; F16K 31/12

[52] U.S. Cl. .............................. 347/85; 137/505.42

[58] Field of Search .................. 347/84–87; 137/505.39, 137/505.42

[56] References Cited

FOREIGN PATENT DOCUMENTS 63-118259 A 5/1988 Japan ....................................... 347/86

*Primary Examiner*—Benjamin R. Fuller
*Assistant Examiner*—Judy Nguyen

[57] ABSTRACT

Pressure regulating apparatus for ink delivered to an ink-jet print head. The apparatus includes an ink pressure regulating valve that is urged shut by a plurality of coned disk springs that apply a substantially constant force to the valve over the length of its travel. The coned disk springs are also called Belleville spring washers.

14 Claims, 7 Drawing Sheets

PRESSURE REGULATING APPARATUS FOR INK DELIVERED TO AN INK-JET PRINT HEAD

FIELD OF INVENTION

The present invention generally relates to ink-jet print cartridges and, more particularly, to apparatus for delivering ink to print heads within such print cartridges.

BACKGROUND OF THE INVENTION

The art of ink-jet technology is relatively well developed. Commercial products such as computer printers, graphics plotters, and facsimile machines employ ink-jet technology for producing printed media. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992), and Vol. 45, No. 1 (February 1944).

Generally, an ink-jet image is formed when a precise pattern of dots is ejected from a drop generating device known as a "print head" onto a printing medium. The typical ink-jet print head has an array of precisely formed nozzles attached to a thermal ink-jet print head substrate. The substrate incorporates an array of firing chambers that receive liquid ink (colorant dissolved or dispersed in a solvent) from an ink reservoir. Each chamber has a thin-film resistor, known as a "firing resistor", located opposite each nozzle so ink can collect between the firing resistor and the nozzle. When electric printing pulses heat the thermal ink-jet firing resistor, a small volume of ink adjacent the firing resistor is heated, vaporizing a bubble of ink, and thereby ejecting a drop of ink from the print head. The droplets strike the printing medium and then dry to from "dots" that, when viewed together, form the printed image. The print head is held and protected by an outer package referred to as a print cartridge.

In general, ink-jet printing is performed in a printer by moving the print head laterally across a printing medium while droplets of ink are ejected from the prim head as described above. The area on the priming medium that could be covered by ink droplets in one pass of the print head is called a swath. At the end of each swath the priming medium is stepped forward a predetermined distance with respect to the lateral path of the print head so that swaths can be set down on the printing medium in abutting relationship one after the other. This process is repeated over and over until the pattern of dots forms the desired image on the printing medium.

One of the significant improvements in ink-jet technology was the development of print heads having longer operating lives. With longer print head life came the desire for larger ink reservoirs so that the print head would fail about the time the printer ran out of ink. This desire for larger ink supplies lead to ink reservoir designs that were stationary on the printer instead of the older designs where the ink reservoirs moved with the print head. In these stationary reservoir designs the ink reservoir is connected to the moving print cartridge by a small bore, flexible ink conduit through which the ink is transferred under pressure. The use of fluid pressure to transfer ink from a reservoir to the print head gave rise to the need for a pressure regulator located near the print head. The pressure regulator reduces the pressure of the ink required for transfer through the conduit down to the operating pressure required for the print head.

The early pressure regulators incorporated thin walled, flexible, plastic bags to actuate the mechanical levers that open and shut the pressure regulating valves. Other designs used thin walled, flexible, plastic diaphragms to actuate the mechanical levers.

These thin walled, plastic bag designs are not without their problems. First, the bags have active surface areas that vary considerably depending on the amount of bag expansion; and second, the bags are subject to bag hysterisis over time as they are inflated and deflated again and again. Further, manufacturing these bags is costly and subject to unpredictable material changes.

Along with the need for an ink pressure regulator, the need for a pressure regulator that provided constant force, back pressure regulation of ink delivered to the print head was perceived. In other words, for optimum operation of an ink-jet print head an ink pressure regulator should deliver ink to the print head at the same, constant pressure irrespective of the amount of ink that is being ejected by the print head.

To provide constant force, back pressure regulation of ink, several spring solutions were attempted and found wanting. Helically wound, constant force springs, in sizes dictated by the size of currently available printers, were found to fail due to fatigue. Elementary cantilever springs and torsional springs were found unable to provide the constant force desired and to require mechanical systems that were too large for conventional printers.

Finally, there is, as with any product, a continuing need to provide a lower cost solution that has a more robust design, that is easy to manufacture and that can accommodate high rates of production.

Thus, it will be apparent from the foregoing that although there are many processes and apparatus for delivering pressurized ink to a prim head, there is still a need for an approach that has low manufacturing cost, provides constant force back pressure and is small in volume.

SUMMARY OF THE INVENTION

Briefly and in general terms, an apparatus according to the present invention includes a valve for regulating ink delivery pressure to an ink-jet print head. The pressure regulating valve includes a valve head and a valve seat that move a length of travel with respect to each other from a valve open position to a valve shut position. The apparatus also has a force spring that urges the valve head and the valve seat to the shut position and that applies a substantially constant force to the pressure regulating valve over the length of travel. The apparatus further includes a bladder that is actuated by the pressure of the ink being delivered to the print head and that urges the valve head and the valve seat between the valve open position and the valve shut position thereby regulating the pressure of ink delivered to the print head.

The force spring can be a plurality of coned disk springs in co-axial alignment.

It should be appreciated that the present invention eliminates the need to regulate ink back pressure using a deformable, thin, plastic bag. Ink back pressure regulation is achieved with a deformable bladder and a plurality of coned spring washers. The coned spring washers also provide constant force back pressure and, in combination with the shape of the valve head, allow a small length of travel from valve shut to valve full open. The present invention also allows for substantial reductions in some dimensions of the print cartridge. There is a major reduction in the overall height of the print cartridge. The height of the print cartride—"H" in FIG. 1—is about equal to the width—"w"

in FIG. 17—of the print head. Also, the width of the print cartridge is about as narrow as the width of the print head. These reductions in size allow the design of smaller, lower cost printers.

Other aspects and advantages of the invention will become apparent from the following detailed description, taken in conjunction with the accompanying drawings, illustrating by way of example the principles of the invention.

DESCRIPTION OF THE PREFERRED EMBODIMENT

Figure 1:
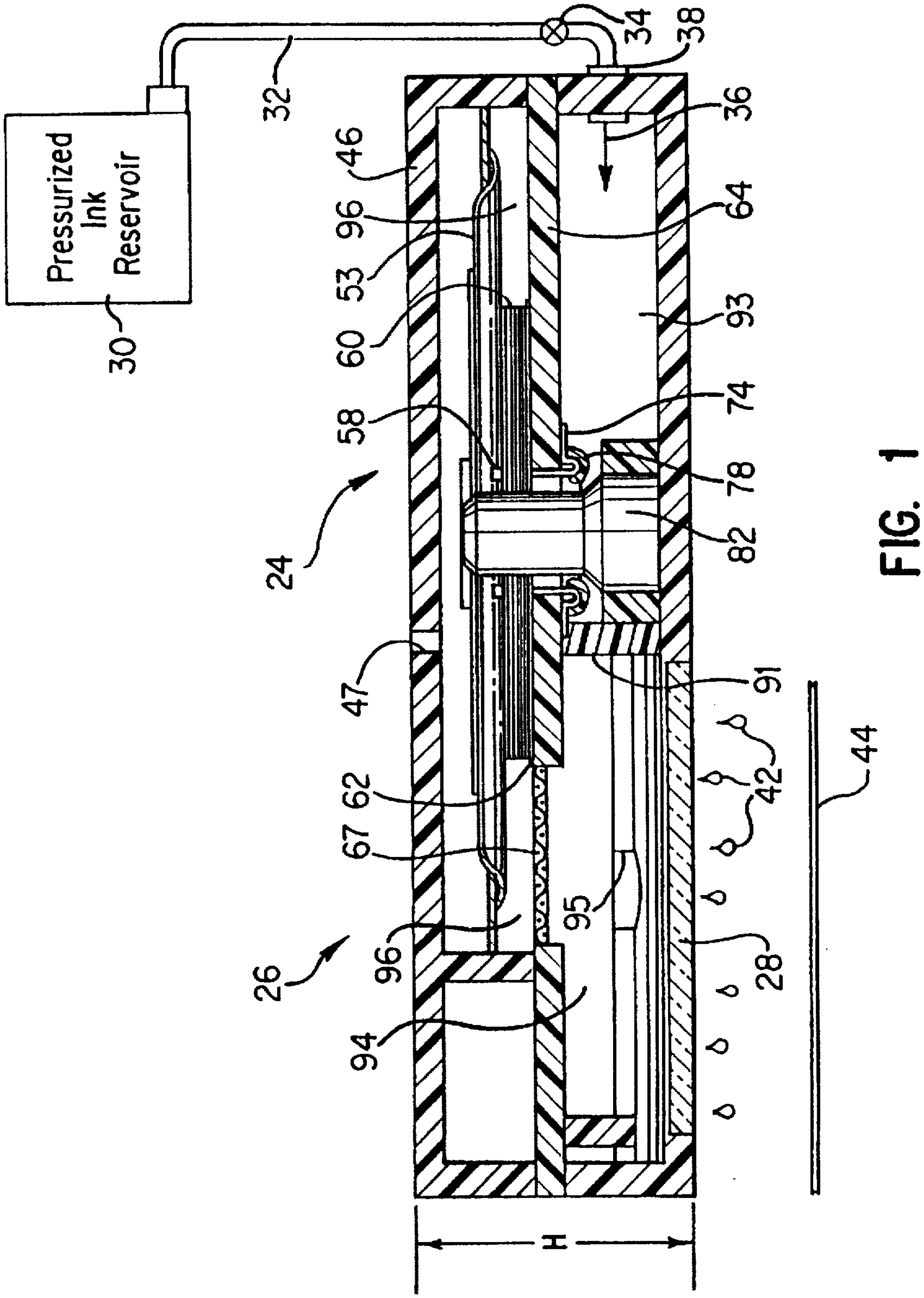
FIG. 1 is a side elevational view, in section, of a pressure regulating apparatus for ink delivered to an ink-jet print head embodying the principles of the invention.

As shown in the drawings for the purposes of illustration, the invention is embodied in a pressure regulator for ink delivered to an ink-jet print head.

The apparatus offers a simple, low-cost, robust solution that is easy to manufacture at high production rates, delivers ink at substantially constant pressure under all operating conditions, and has a very small size.

Referring to FIG. 1, reference numeral 24 generally indicates a pressure regulator within a print cartridge 26 for delivering ink to an ink-jet prim head 28 at a delivery pressure. The pressure regulator 24 is connected to an ink reservoir 30 by an ink conduit 32. The ink conduit contains a shut-off valve 34 and a hollow needle 36 at its distal end. The needle is inserted into a septum 38 in the pressure regulator 24 to establish fluid communication from the ink reservoir 30 through the ink conduit 32 to the pressure regulator.

The ink in the reservoir 30 is pressurized to an absolute pressure that is greater than the delivery pressure to the print head 28 so the ink will flow under fluid pressure through the system. The delivery pressure to the print head is normally within a range of about minus three to about minus six inches (−3" to −6") of water. The pressure in the reservoir is normally between about minus two inches (−2") of water to about twenty pounds per square inch (20 psi).

The ink conduit 32, FIG. 1, is a small bore, flexible tube that permits the ink reservoir 30 and the print cartridge 26 to move with respect to each other within the printer (not shown). The valve 34 is a shut-off valve so that ink can be prevented from leaking from conduit when the needle 36 is removed from the print cartridge.

Referring to FIG. 1, the print head 28 ejects droplets 42 of ink onto a printing medium 44 that dry to form dots. These dots when viewed together form an image on the printing medium.

Figure 2:
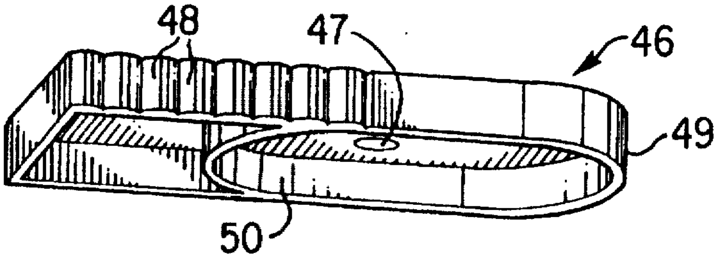
FIG. 2 is a perspective view of a lid for the apparatus of FIG. 1.

Referring to FIG. 2, reference numeral 46 generally indicates a lid that forms the top portion of the housing for the print cartridge 26. The lid is fabricated from a liquid crystal polymer and contains a vent hole 47 in the top wall that communicates atmospheric pressure to the interior of the pressure regulator 24. Along the side walls of the lid are a plurality of ridges 48 that enable the print cartridge to be easily grasped. The lid has a rounded end wall 49 that indicates the direction of insertion of the print cartridge into the printer (not shown). Within the lid 46 is an arcuate interior side wall 50 that supports a portion of the structure of the pressure regulator 24.

Figure 3:
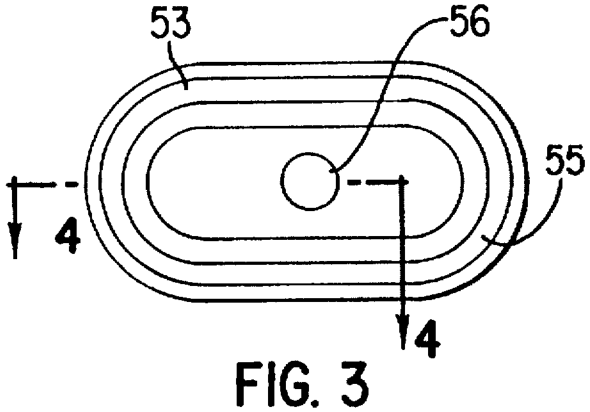
FIG. 3 is a top plan view of a bladder for the apparatus of FIG. 1.
Figure 4:
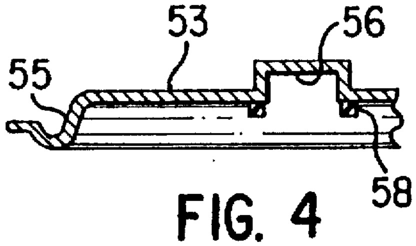
FIG. 4 is a side elevational view of the bladder of FIG. 3, partially cut away and in section taken along line 4—4 of FIG. 3.

Referring to FIGS. 3 and 4, reference numeral 53 indicates a bladder fabricated from a fluorosilicone elastomer material. The bladder is a thin membrane with a convoluted periphery 55 that allows the bladder to flex up and down in the lid 46 in response to changes in the delivery pressure of ink to the print head 28. The top side of the bladder is referenced to atmospheric pressure through the vent hole 47 in the lid 46, FIG. 2. The bladder flexes due to the differential of atmospheric pressure and the pressure of the ink delivered to the print head. The edge of the bladder is sealed to the arcuate interior wall 50 of the lid so that the bladder can flex in response to changes in the delivery pressure with respect to atmospheric pressure. Within the center of the bladder is a pocket 56 that receives and aligns a portion of the structure of the pressure regulator 24 during operation.

Figure 5:
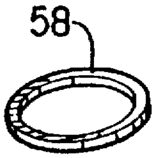
FIG. 5 is perspective view of a wear ring for the apparatus of FIG. 1.

Referring to FIGS. 4 and 5, located around the edge of the pocket 56 of the bladder is a wear ring 58. The wear ring is fabricated from stainless steel and prevents the bladder from being worn abraded by metal contact when the bladder flexes during pressure changes.

Figure 6:
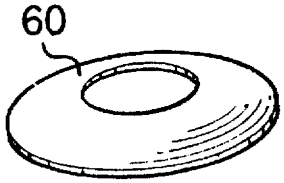
FIG. 6 a perspective view of a single coned disk spring for the apparatus of FIG. 1.
Figure 7:
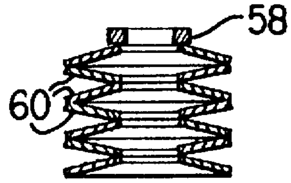
FIG. 7 is a side elevational view, in section, of a stack of coned disk springs for the apparatus of FIG. 1.

In FIGS. 6 and 7 reference numeral 60 indicates a force spring. The force spring is a plurality of coned, disk springs or Belleville washers. Each disk spring is circular, has a center hole, and has a concave cross section. Each disk is very compact, easily fabricated and can be stamped out at high production speeds. When a load is applied to a washer, the washer tends to flatten causing radial and circumferential strains. The flattening is elastic deformation and constitutes spring action. The washers are co-axially and alternately stacked as illustrated in FIG. 7. The Belleville washers are sized to have a nonlinear load deflection characteristic such that they maintain a substantially constant force over their range of travel regardless of dimensional variations due to wear, temperature changes, and tolerances.

Figure 8A:
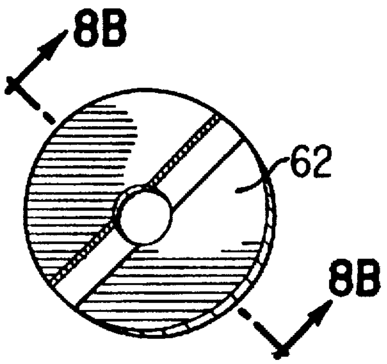
FIG. 8A is a perspective view of a second wear washer for the apparatus of FIG. 1.
Figure 8B:
FIG. 8B is a side elevational view of the second wear washer, in cross section taken along line 8B—8B of FIG. 8A.

Referring to FIG. 8, reference numeral 62 indicates a wear washer fabricated from stainless steel. The stack of coned disk springs rests on this washer and most of deflection and motion occurs at this interface. The washer is made of stainless steel so that it will not chemically react with the ink. The washer also has a channeled grove in each of its planar faces to provide a channel for ink to flow radially outward as described below. The channeled grooves do not affect the wear resistance of the washer to the stack of coned disk springs.

Figure 9:
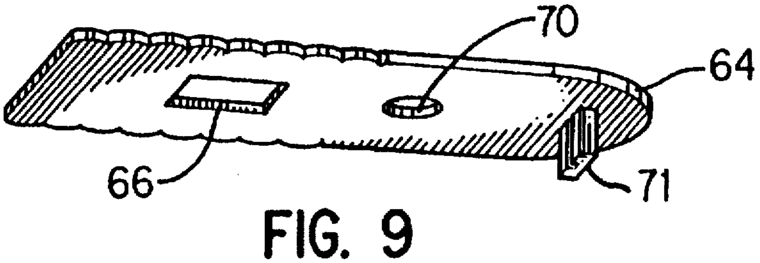
FIG. 9 is a perspective view of a shelf for the apparatus of FIG. 1.
Figure 10:
FIG. 10 is a perspective view of a filter screen for the apparatus of FIG. 1.

In FIG. 9, reference numeral 64 indicates an interior shelf. The shelf is illustrated from below so that the features of its construction can be seen. The shelf spans the lid 46, FIG. 2 and is fabricated from a liquid crystal polymer and is generally planar. Located on the shelf opposite the print head 28 is a removed area 66, FIG. 9. The removed area receives a screen 67, FIG. 10. The screen filters out any undissolved particulate materials in the ink before these materials can reach the print head. Centrally on the shelf is a hole 70 that aligns the co-axial parts in the pressure regulator 24 as described below. At the rounded end of the shelf are two posts 71 that extend to the bottom wall of the pressure regulator. The two posts act as a hard stop for the septum 38, FIG. 1 so that it may not be pushed completely into the housing when the hollow needle 36, FIG. 1 is inserted.

Figure 12:
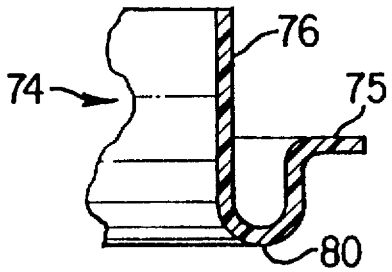
FIG. 12 is a side elevational view of the inlet tube of FIG. 11, partially cut away and in section taken along line 12—12 of FIG. 11.
Figure 11:
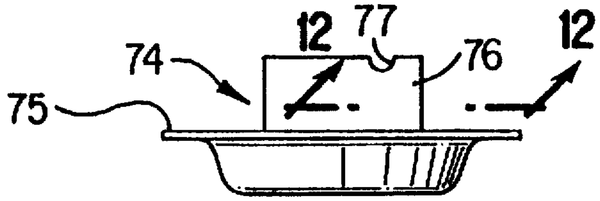
FIG. 11 is a side elevational view of an inlet tube for the apparatus of FIG. 1.
Figure 20:
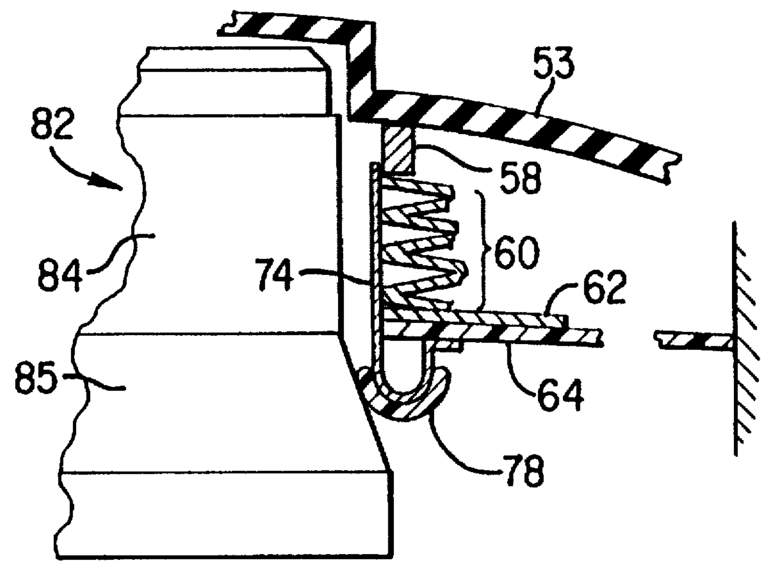
FIGS. 20 and 21 are side elevational views, partially cut away and partially in section, of the pressure regulating valve of the apparatus of FIG. 1 illustrating the valve open and valve shut positions, respectively.
Figure 21:
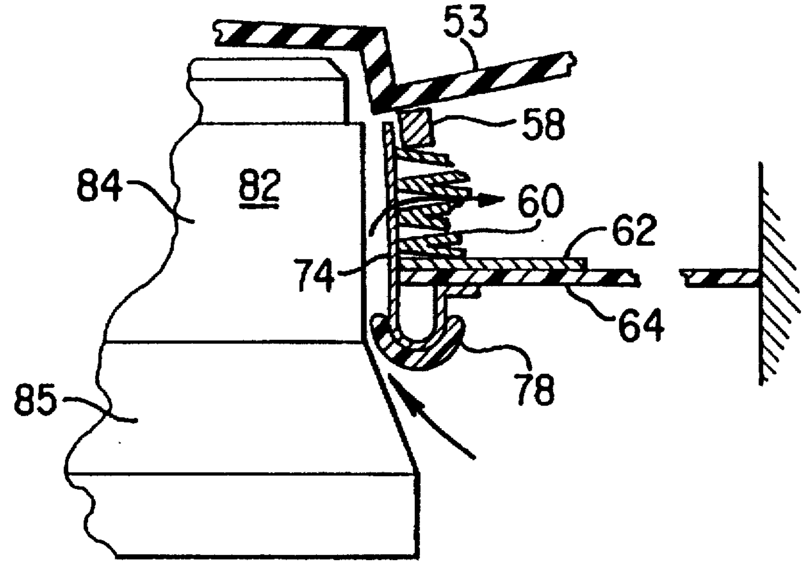

In FIG. 11 reference numeral 74 indicates an inlet tube for the pressure regulator 24. The inlet tube is axially symmetric, has a cross section illustrated in FIG. 12, and is fabricated from stainless steel. The tube is a reversed deep-drawn part that is easily fabricated. The outer periphery 75 of the inlet tube forms a datum when the tube is inserted into the central hole 70 in the shelf 64, FIG. 9. The inside diameter of the tube is one wall of the ink flow conduit to the pressure regulating valve as described below. Located in the open end of the cylindrical portion 76 is a notch 77 that allows the ink to flow across the interface between the inlet tube and the wear ring 58, FIG. 21. The outside diameter of the tube in the cylindrical portion 76 aligns the spring washers. The cylindrical portion 76 of the inlet tube 74 is inserted into the central hole 70, of the shelf 64, FIG. 9. as illustrated in FIGS. 20 and 21. The wear washer 62, is thereafter dropped over the protruding cylindrical end followed by the spring washers 60, much like tossing rings over a post.

Figure 13:
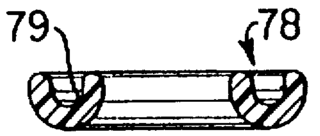
FIG. 13 is a side elevational view, in section, of a valve seat for the apparatus of FIG. 1.

In FIG. 13 reference numeral 78 indicates a valve seat for the pressure regulating valve. The valve seat is a grommet seal made from an elastomeric material. The valve seat has a generally annular shape and a generally concave shape in cross section as illustrated in FIG. 13. The concave section is indicated by reference numeral 79. The valve seat fits over the bottom curved portion 80, FIG. 12, of the inlet tube 74 as best seen in FIGS. 20 and 21. When assembled, the valve seat is mounted to the shelf 64 by the inlet tube.

Figure 14:
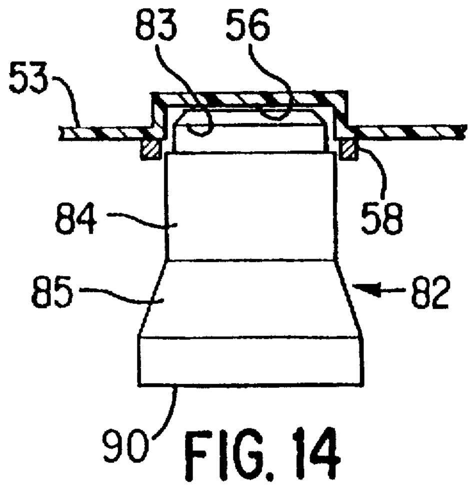
FIG. 14 is a side elevational view, partially in section and cut away, of a valve head for the apparatus of FIG. 1.

Referring to FIG. 14, reference numeral 82 generally indicates a valve head for the pressure regulating valve. The valve head is axially symmetric, generally cylindrical in shape, and is fabricated from high density polyethylene. The upper end of the valve head has a lead-in feature 83 that is received in the pocket 56 of the bladder 53, FIG. 4. When the bladder flexes due to changes in the delivery pressure of the ink, the valve seat moves in response. The valve head also includes a central cylindrical portion 84. The cylindrical portion is received within the inside diameter of the cylindrical portion 76, FIG. 11, of the inlet tube. It should be noted that there is an annular, ink flow conduit formed between the outside diameter of the cylindrical portion 84 of valve head 82 and the inside diameter of the inlet tube 74. The valve head also has a frustum portion 85, FIG. 14. The frustum portion is received within the inner diameter of the valve seat 78, FIG. 13. When the valve seat 78 moves up and down due to the flexing of the bladder, the frustum portion 85 and the valve seat 78 exhibit relative motion. This motion is between a valve open position illustrated in FIG. 21 and a valve shut position illustrated in FIG. 20. This motion regulates the pressure of the ink delivered to the print head 28.

It should be appreciated that the coned, spring washers and the slope of the frustum portion of the valve head together produce a valve with a short length of travel from valve full open to valve shut. In one embodiment actually designed, the length of travel was less than eight thousandths of an inch (0.008").

Figure 15:
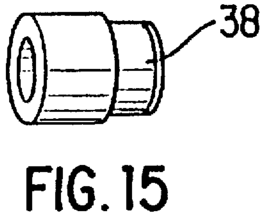
FIG. 15 is a perspective view of a septum for the apparatus of FIG. 1.
Figure 17:
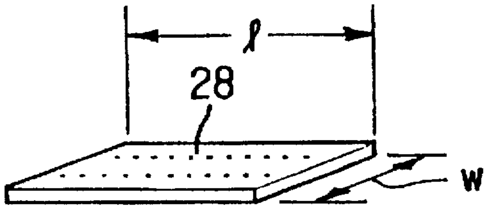
FIG. 17 is a perspective view of a print head for the apparatus of FIG. 1.

The septum 38 is illustrated in FIG. 15. The septum is a resilient, natural rubber plug that is pressed into a septum orifice 92 located in the arcuate side wall of the print cartridge. The septum is prevented from being pushed completely into the print cartridge by the two posts 71 located on the bottom wall of the shelf 64, FIG. 9. Ink is passed from the ink reservoir 30, FIG. 1, through the ink conduit 32 and into the print cartridge when the hollow needle 36 is inserted through the septum 38 and the valve 34 is opened.

Figure 16:
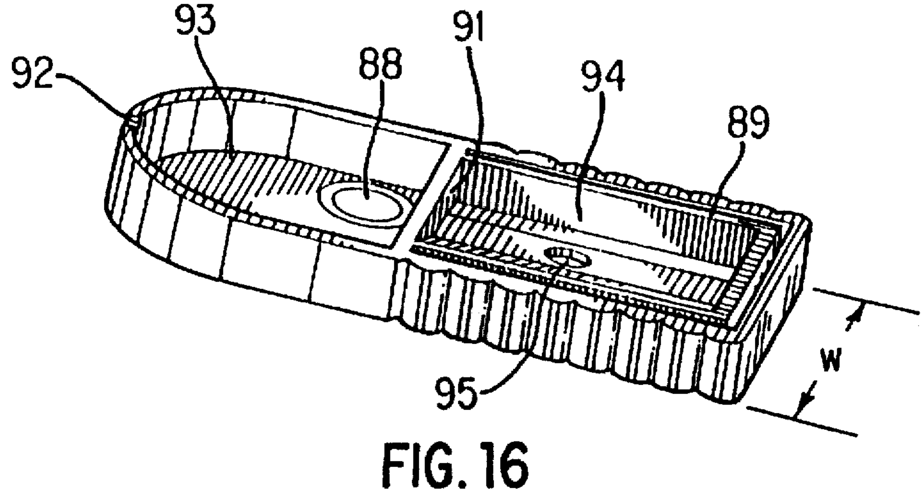
FIG. 16 is a perspective view of a cartridge body for the apparatus of FIG. 1.

The cartridge body 89 is illustrated in FIG. 16 and receives the lid 46, FIG. 2. The cartridge body is fabricated from a liquid crystal polymer and contains an interior side wall 91 that separates the body into two chambers, a secondary ink reservoir 93 and a stand pipe 94. Reference numeral 96, FIG. 1, refers to an interstitial reservoir formed by the shelf 64 and the filter screen 67 and the bottom wall of the flexible bladder 53. The secondary ink reservoir is the first chamber into which the ink flows when it enters the pressure regulator 24. The stand pipe is the chamber into which the ink flows after the ink passes through the filter screen 67, leaving the interstitial reservoir 96. The pressure of ink delivered to the print head is the pressure in the stand pipe 94. The ink at the delivery pressure flows out of the stand pipe 94 through a through hole 95 in the bottom wall of the cartridge body 89. The through hole 95 leads directly to the rear of the print head 28 when the ink is finally delivered by the pressure regulator 24.

Figure 18:
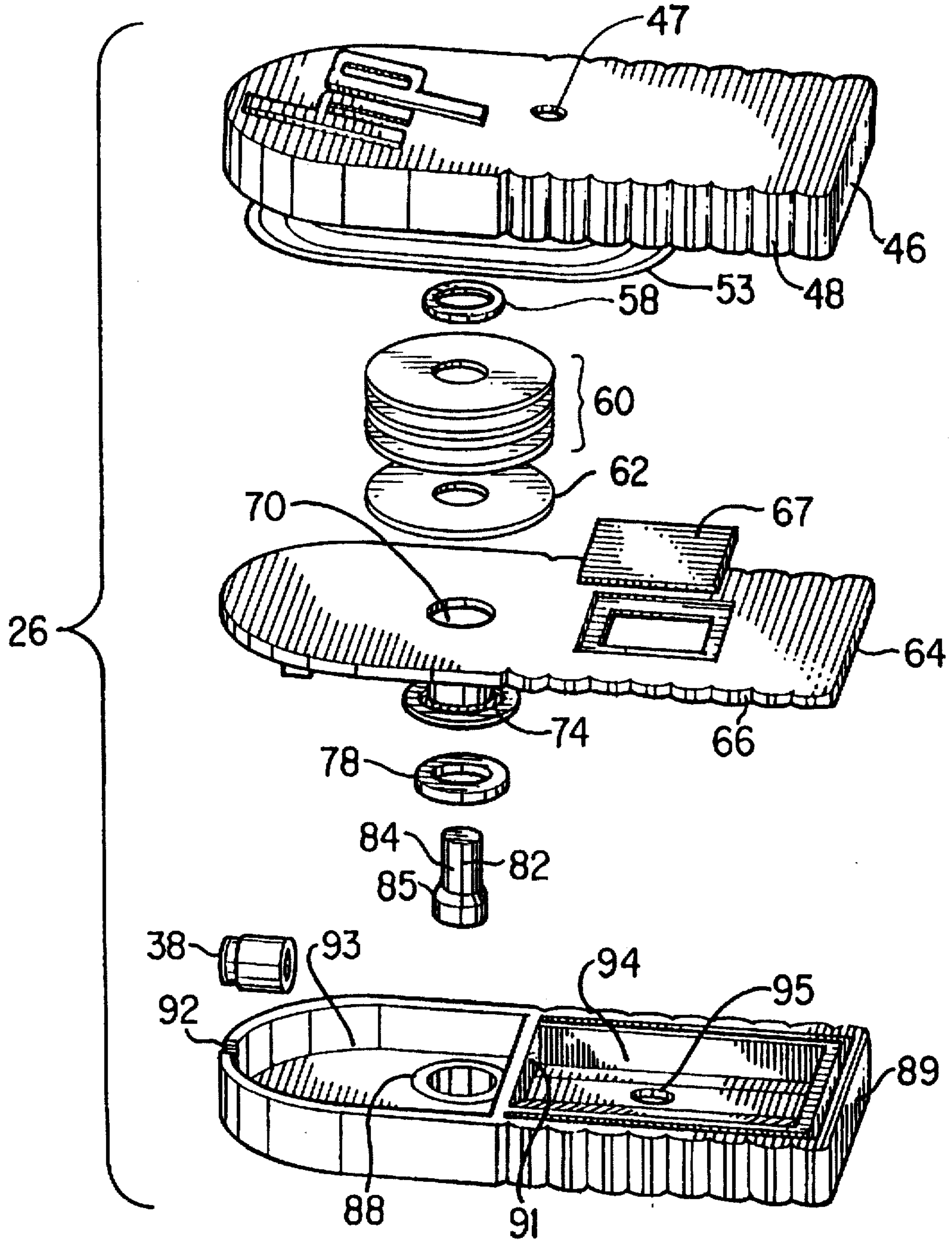
FIG. 18 is an exploded view in perspective and viewed from above of the apparatus of FIG. 1.
Figure 19:
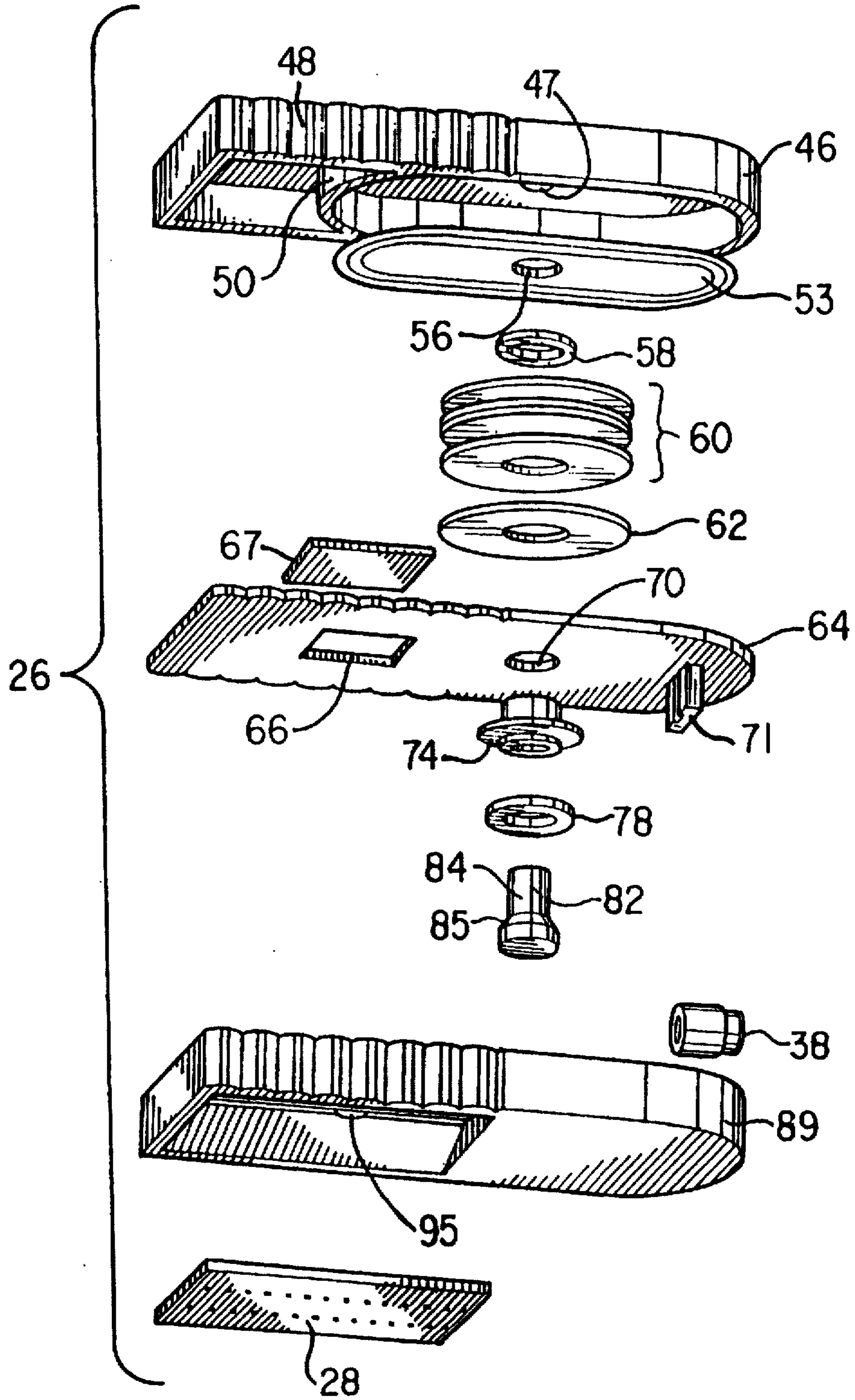
FIG. 19 is an exploded view in perspective and viewed from below of the apparatus of FIG. 1.

FIGS. 18 and 19 illustrate the various parts of print cartridge and how they fit together. The parts in co-axial relationship are as follows: the a boss 88 receiver the bottom of the valve head 82; the inlet tube 74 is received in the central hole 70 of the shelf 64 and engages the valve seat 78; the cylindrical portion 84 of the valve head 82 passes through, in turn, the valve seat 78, the inlet tube 74, the central hole 70, the wear washer 62, the coned springs 60, and the wear ring 58; and the top 83 of the valve head enters the pocket 56 of the bladder 53.

As for the other components, the septum 38, FIG. 18, is received in the septum orifice 92 in the cartridge body 89.

The filter screen 67 is mounted on the removed area 66 of the shelf 64, FIG. 18. The periphery of the bladder 53 is mounted on the interior wall 50, FIG. 19 inside of the lid 46. Finally, after the components are fully assembled, the lid 46 is ultrasonically welded to the cartridge body 89 to form a fluid tight seal.

The flow path of the ink begins at the pressurized ink reservoir 30, FIG. 1, goes through the ink conduit 32 and hollow needle 36, and enters the secondary ink reservoir 93. If the valve head 82 is in the valve shut position as illustrated in FIG. 21, the flow stops. If the valve head 82 is in the valve open position as illustrated in FIG. 21, the ink flows past the valve seat 78 and up the annular conduit formed by the outside diameter of the cylindrical portion 84 of the valve head 82 and the inside diameter of the inlet tube 74. The ink thereafter flows through the notch 77, FIG. 11 in the end of the inlet tube 74, then radially outward through the coned rings 60 and the wear washer 62, FIGS. 8A and B, and thereafter into the interstitial reservoir 96, FIG. 1. The interstitial reservoir is formed between the shelf 64 and the bottom wall of the flexible bladder 53. The ink thereafter flows out of the interstitial reservoir 96, through the filter screen 67, and into the standpipe 94. From the standpipe the ink flows through the through hole 95 and is delivered to the back of the print head 28.

The operation of the pressure regulator is shown in FIGS. 1, 20, and 21. The top wall of the bladder 53 is vented to the atmosphere by the vent 47 in the lid 46. The bottom wall of the bladder is one of the inside walls of the interstitial reservoir 96, FIG. 1 and is thus exposed via the filter screen 67 to the pressure of the ink delivered to the print head 28. The bladder flexes up and down depending on the differential pressure across it. If the pressure in the interstitial reservoir 96, FIG. 1, in conjunction with the force of the coned disk springs 60 is greater than the atmospheric pressure, the bladder is urged upward. If the pressure in the interstitial reservoir 96 is less, the bladder is urged downward. The bladder engages the cylindrical portion 84 of the valve head 82 and forces the valve head either up or down depending on the differential pressure across the bladder.

FIG. 20 illustrates the pressure regulating valve in the valve shut position. The valve is normally shut. When the print head 28 begins jetting ink, the ink is drawn out of the standpipe 94 through the through hole 95. This flow causes the pressure in the standpipe to lower and the bladder 53 to flex downward in response to the differential pressure across its face. The bladder engages the valve head 82 and forces it downward against the urging of the coned disk springs 60. Downward motion of the valve head 82 is motion toward the valve open position as illustrated in FIG. 21. The valve seat 78 is stationary and the frustum portion 85 of the valve head 82 moves downward away from the valve seat, thus opening the pressure regulating valve. As the valve head moves to the valve open position, ink is allowed to flow past the frustum portion 85 of the valve head 82 and the valve seat 78. The ink flows into the into the interstitial reservoir 96, FIG. 1, through the filter screen 67, and into standpipe 94 and the pressure in the standpipe rises back to its normal operating pressure. The bladder is thereby flexed downward less and less by the differential pressure across the bladder. As the normal operating pressure is approached, the valve head 82 returns to the valve shut position as illustrated in FIG. 20. Thus, a pressure regulating cycle is completed.

It can now be recognized that the present invention also provides a print head having a generally planar shape with a length dimension, "l," and a width dimension, "w," wherein "l" is larger than "w." The capability of construction of a small print cartridge 26, containing both the print head 28 and the pressure regulator 24; this provides a cartridge with a height "H," (FIG. 1) equal to about the width "w" of the print head measured orthogonally to the plane of the print head. The print cartridge 26 also has a width, "W," physically only slightly greater than or even about equal to the width "w" of the print head 28.

Although specific embodiments of the invention have been described and illustrated, the invention is not to be limited to the specific forms or arrangement of parts so described and illustrated. The invention is limited only by the claims.

I claim:

1. A pressure regulating apparatus for regulating flow of ink delivered to an ink-jet print head from an ink reservoir, comprising:

a print cartridge having an ink inlet coupled to said ink reservoir;

a valve in said cartridge for regulating ink delivery pressure, said valve having a valve head and a complementary valve seat, wherein said valve seat is mounted to move a length of travel with respect to said valve head between a valve open position to a valve shut position, respectively;

a force spring connected to the valve seat, biasing the valve seat toward the shut position, applying a substantially constant force over the length of travel;

an ink delivery conduit at least partially contained within said force spring, fluidically connecting the valve to the ink-jet print head and delivering ink to the ink-jet print head at a delivery pressure; and a bladder, mounted to said valve head and actuated by atmospheric pressure balanced against pressure of ink delivered to the ink-jet print head, urging the valve seat out of and into contact with the valve head and thereby between the valve open position and the valve shut position and regulating the pressure of ink delivered from the reservoir under a positive pressure to the ink-jet print head such that a predetermined back pressure is maintained at the print head.

2. The apparatus of claim 1 wherein the force spring further comprises:

a plurality of coned disk springs operationally mounted on the valve seat.

3. The apparatus of claim 2 wherein the valve further comprises:

an ink inlet conduit having a cylindrical surface, said ink inlet conduit mounted such that the coned disk springs are maintained about said conduit in co-axial alignment within the pressure regulating apparatus.

4. The apparatus of claim 3 wherein the valve head further comprises:

a cylindrical surface wherein the cylindrical surface of the ink conduit and the cylindrical surface of the valve head are co-axial and together form an annular ink conduit within the apparatus.

5. The apparatus of claim 1 further comprising:

the valve seat includes a generally annular shape mechanism, movable with respect to the valve head, and the valve head has a conical frustum shaped portion having a mating surface complementary with said valve seat when said valve is in said shut position.

6. A pressure regulated ink-jet cartridge apparatus fluidically coupled to a supply of ink, comprising:

a print cartridge;

an ink-jet print head mounted to said print cartridge;

a pressure regulator within said print cartridge for delivering ink to the ink-jet print head at a delivery pressure, said regulator having a valve mechanism including a valve head and a complementary valve seat, wherein said valve seat is mounted for moving with respect to the valve head from a valve open position to a valve shut position, and thereby regulating the ink delivery pressure, a plurality of co-axially mounted coned disk springs mounted to the valve seat to urge the valve seat toward the shut position, and a bladder, mounted on said valve mechanism and coupled to said springs such that said bladder is actuated by balancing atmospheric pressure against pressure of ink being delivered to the ink-jet print head, such that the valve seat moves out of and into contact with the valve head and thereby between the valve open position and the valve shut position based upon a pressure differential between said atmospheric pressure and said delivery pressure, and thereby regulating the pressure of ink delivered to said ink-jet print head to maintain a predetermined back pressure at the print head; and the ink-jet print head having a generally planer shape with a length "l" and a width ",," where "l" is larger than "w," said print cartridge containing both the print head and the pressure regulator and having a height "H" approximately equal to the width "w" of the print head measure orthogonally to a major planar surface of the print head.

7. The apparatus of claim 6 wherein said print cartridge further comprises:

a width—"W"— approximately equal to the width—"w"— of the print head.

8. A pressure regulated ink-jet cartridge, comprising:

an ink-jet print head within the print cartridge for jetting droplets of ink on demand onto a printing medium, said print head having a generally planar shape; and a pressure regulator within the print cartridge for delivering ink to the ink-jet print head at a negative delivery pressure, said regulator having a valve head and a complementary valve seat, wherein said valve seat moves relative to said valve head from a valve open position to a valve shut position, said valve head has a portion in a shape of a frustum of a cone, said valve seat is configured to move in response to pressure of the ink being delivered to the print head balanced against atmospheric pressure, and said valve head is captured by a plurality of co-axially mounted coned disk springs that urge the valve seat relative to the valve head toward the valve shut position, said frustum portion and valve seat changing from the valve shut position to the valve open position by a length of travel of the valve seat of less than a predetermined length of travel.

9. The pressure regulated ink-jet cartridge as set forth in claim 8, further comprising:

said predetermined length of travel is approximately eighth thousandths of an inch (0.008").

10. The pressure regulated ink-jet cartridge as set forth in claim 8, further comprising:

an ink reservoir within the cartridge, fluidically coupled to a remote pressurized ink reservoir having a supply of ink therein;

an ink inlet tube formed at least in part by said valve seat and surrounding said valve head, forming an ink channel around said valve head;

each of said coned disk springs having an ink flow passage fluidically coupled to said ink channel for receiving ink from said ink reservoir within said cartridge through said inlet tube when said regulator is in the valve open position.

11. The pressure regulated ink-jet cartridge as set forth in claim 10, further comprising:

an interstitial reservoir for transferring ink received from each of said ink flow passages to said print head.

12. The pressure regulated ink-jet cartridge as set forth in claim 11, further comprising:

a bladder mounted within said interstitial reservoir, wherein said bladder, on a first surface thereof, is coupled to an upper-most one of said coned disk springs and open to atmospheric pressure on a second surface thereof.

13. The pressure regulated ink-jet cartridge as set forth in claim 8, further comprising:

the ink-jet print head having a generally planar shape with a length "l" and a width "w," where "l" is larger than "w," said print cartridge containing both the print head and the pressure regulator and having a height "H" approximately equal to the width "w" of the print head measure orthogonally to a major planar surface of the print head.

14. The pressure regulated ink-jet cartridge as set forth in claim 13, further comprising:

a width "W" approximately equal to the width "w" of the print head.

* * * * *

UNITED STATES PATENT AND TRADEMARK OFFICE

CERTIFICATE OF CORRECTION

PATENT NO. : 5,737,001
DATED : April 7, 1998
INVENTOR(S) : Taylor

It is certified that error appears in the above-identified patent and that said Letters Patent is hereby corrected as shown below:

Column 9,
Line 27, delete ““,”” and insert therefor -- “w” --.

Signed and Sealed this

Fourth Day of November, 2003

JAMES E. ROGAN
*Director of the United States Patent and Trademark Office*